(12) United States Patent
Watanabe et al.

(10) Patent No.: US 8,488,241 B2
(45) Date of Patent: Jul. 16, 2013

(54) OPTICAL FILM AND METHOD FOR MANUFACTURING THE SAME, ANTIGLARE POLARIZER, AND DISPLAY APPARATUS

(75) Inventors: Hitoshi Watanabe, Miyagi (JP); Shogo Sato, Miyagi (JP); Shinichi Matsumura, Miyagi (JP)

(73) Assignee: Sony Corporation, Tokyo (JP)

( * ) Notice: Subject to any disclaimer, the term of this patent is extended or adjusted under 35 U.S.C. 154(b) by 609 days.

(21) Appl. No.: 12/675,949

(22) PCT Filed: Jul. 3, 2009

(86) PCT No.: PCT/JP2009/062565
§ 371 (c)(1),
(2), (4) Date: Mar. 1, 2010

(87) PCT Pub. No.: WO2010/005065
PCT Pub. Date: Jan. 14, 2010

(65) Prior Publication Data
US 2010/0238548 A1    Sep. 23, 2010

(30) Foreign Application Priority Data
Jul. 7, 2008  (JP) ................................ P2008-177258

(51) Int. Cl.
*G02B 27/00* (2006.01)
(52) U.S. Cl.
USPC ..................................... 359/488.01; 359/601
(58) Field of Classification Search
USPC ............................................ 359/488.01, 601
See application file for complete search history.

(56) References Cited

U.S. PATENT DOCUMENTS

| 6,861,121 B2* | 3/2005 | Matsunaga et al. ........... 428/141 |
| 7,661,832 B2* | 2/2010 | Iwata et al. ................... 359/601 |
| 7,848,021 B2* | 12/2010 | Asakura et al. ............... 359/599 |
| 2007/0268587 A1* | 11/2007 | Ninomiya et al. ............. 359/601 |
| 2008/0218865 A1* | 9/2008 | Iwata et al. .................... 359/601 |

FOREIGN PATENT DOCUMENTS

| JP | 04-059605 | 2/1992 |
| JP | 07-290652 | 11/1995 |
| JP | 2004-29240 | 1/2004 |
| JP | 2005-156615 | 6/2005 |
| JP | 2006-072315 | 3/2006 |
| JP | 2006-116805 | 5/2006 |
| JP | 2007-114563 | 5/2007 |

OTHER PUBLICATIONS

International Search Report dated Aug. 31, 2009, for corresponding Patent Application PCT/JP2009/062565.
Japanese Office Action issued May 29, 2012, for corresponding Japanese Appln. No. 2008-177258.
Japanese Office Action issued on Mar. 5, 2013 in corresponding Japanese Patent Application No. 2008-177258.

* cited by examiner

*Primary Examiner* — Frank Font
(74) *Attorney, Agent, or Firm* — K&L Gates, LLP

(57) ABSTRACT

An optical film includes a base member having convex structures that are two-dimensionally and orderly arranged on a surface thereof and a hard-coating layer provided on the surface of the base member, the surface having the arranged structures thereon. A continuous wave surface is provided on a surface of the hard-coating layer so as to approximately conform to the shape of the structures of the surface of the base member, a maximum amplitude A and a minimum wavelength λ of the continuous wave surface are each substantially uniform, and a ratio (A/λ) of the maximum amplitude A to the minimum wavelength λ is more than 0.002 and 0.011 or less.

23 Claims, 14 Drawing Sheets

OPTICAL FILM AND METHOD FOR MANUFACTURING THE SAME, ANTIGLARE POLARIZER, AND DISPLAY APPARATUS

CROSS REFERENCE TO RELATED APPLICATIONS

The present application is a National Stage of International Application No. PCT/JP2009/062565 filed on Jul. 3, 2009 and which claims priority to Japanese Patent Application No. 2008-177258 filed on Jul. 7, 2008, the entire contents of which are being incorporated herein by reference.

BACKGROUND

The present disclosure relates to an optical film and a method for manufacturing the same, an antiglare polarizer, and a display apparatus. More specifically it relates to an optical film provided with a hard-coating layer.

Recently, various display apparatuses such as liquid crystal displays (LCDs) and plasma display panels (PDPs) have been widely used. The visibility of screens of these display apparatuses is significantly inhibited particularly in bright places when external light such as sunlight or interior illumination is reflected. Accordingly, optical films such as antiglare films that diffuse-reflect such external light at the surface of a screen are often used.

Heretofore, in such optical films, in order to diffuse-reflect external light at the surface of a screen, a technique in which a fine concavo-convex structure is formed on the surface has been employed. Specifically, a method of applying, on a transparent plastic base member, a diffusion layer in which transparent fine particles are dispersed in a hard-coat coating material in consideration of an abrasion property has been mainly employed for current liquid crystal display apparatuses.

However, in the above-mentioned various display apparatuses typified by recent flat-screen televisions, an improvement of image quality and an increase in definition have rapidly progressed, and the size of pixels has been decreased. Consequently, light that is transmitted through an optical film is distorted by refraction or diffusion caused by fine particles in an antiglare layer or a surface concavo-convex structure, resulting in problems that an image becomes unclear, glare occurs due to a phenomenon of variations in the luminance, and the surface has a grayish brown image quality, thereby significantly degrading the quality. Accordingly, current optical films having a surface concavo-convex structure formed using fine particles cannot sufficiently follow the above-mentioned improvement in image quality and increase in definition. Thus, realization of an optical film having a surface concavo-convex structure formed without using fine particles has been desired.

Meanwhile, heretofore, as techniques for forming a fine concavo-convex structure on a surface to diffuse-reflect external light on the surface of a screen, techniques for forming a fine concavo-convex structure by embossing (shape transfer) have been studied, as described in Japanese Examined Patent Application Publication No. 4-59605, Japanese Patent No. 3,374,299, and Japanese Unexamined Patent Application Publication Nos. 2004-29240 and 2005-156615.

Japanese Examined Patent Application Publication No. 4-59605 proposes a method for manufacturing a high-definition non-reflective polarizing plate including forming a fine concavo-convex roughened surface on a surface of a polarizing plate protective film composed of a cellulosic plastic by an embossing process, and further dissolving a part of a surface layer of the fine concavo-convex roughened surface with an organic solvent.

Japanese Patent No. 3,374,299 proposes a method for manufacturing an antiglare film including a transparent plastic film, a rough concavo-convex layer composed of an ionizing radiation-curable resin and provided on the plastic film, and fine concavities and convexities disposed along the surface of the rough concavo-convex layer, wherein the rough concavities and convexities are formed by any of an embossing method, a sand-blasting method, and a resin convention method during drying, and the fine concavities and convexities are formed of a thin-film coating layer or using a lifting effect.

Japanese Unexamined Patent Application Publication No. 2004-29240 proposes a method for manufacturing an antiglare antireflection film including forming concavities and convexities on a surface of the film by an embossing process wherein the arithmetic mean roughness of concavities and convexities of a plate used in the embossing process is controlled to be 0.05 or more and 2.00 µm or less, and the average period of the concavities and convexities is controlled to be 50 µm or less.

Japanese Unexamined Patent Application Publication No. 2005-156615 proposes a method for manufacturing an antiglare film in which, in a step of forming a thermoplastic resin film, before or after concavities and convexities are formed on a surface by pressing a mold onto the film surface, the film is stretched with a tenter, and a hard-coating layer is formed on the resulting concavo-convex surface.

As described above, according to Japanese Examined Patent Application Publication No. 4-59605, a fine concavo-convex roughened surface is formed on a surface of a cellulosic plastic used as a polarizing plate protective film by an embossing process, and the fine concavo-convex roughened surface is partly dissolved with an organic solvent to form a smooth concavo-convex surface, thus producing a high-definition non-reflective polarizing plate. However, since a hard-coating layer is not provided on the surface, the polarizing plate has a poor abrasion property. Accordingly, it is difficult to use this polarizing plate in liquid crystal display products, such as liquid crystal televisions, which require durability. In addition, Japanese Examined Patent Application Publication No. 4-59605 is silent about a surface profile that exhibits an antiglare property.

In Japanese Patent No. 3,374,299, and Japanese Unexamined Patent Application Publication No. 2004-29240, the surface profile is specified by means of the surface roughness, but the arithmetic mean roughness statistically includes large and small complex concavities and convexities. Therefore, a diffuse reflection property is not controlled at all and the resulting antiglare film becomes grayish brown, resulting in a problem of a significant degradation of image quality.

Japanese Unexamined Patent Application Publication No. 2005-156615 proposes an antiglare film produced by transferring a concavo-convex shape on a surface of a thermoplastic resin film by pressing a mold in a step of forming the thermoplastic resin film, and forming a hard-coating layer on the surface of the film by application. However, as for the surface profile, the center-line mean roughness Ra of the concavo-convex surface of the thermoplastic resin is merely limited to the range of 0.05 to 10 µm (refer to, for example, claim 11), and no surface profile that exhibits an antiglare property is described. Accordingly, a diffuse reflection property is not controlled at all and the resulting antiglare film becomes grayish brown, resulting in a problem of a significant degradation of image quality.

As described above, in conventional optical films in which an antiglare property is exhibited by means of the surface profile without using fine particles, the surface property is merely controlled to have a concavo-convex shape, the surface profile is merely specified by means of the surface roughness (arithmetic mean roughness), or the surface profile is merely specified by means of the diffuse reflection property (optical property). Thus, a specific surface profile is not specified.

Accordingly, it is desirable to provide an optical film and a method for manufacturing the same, an antiglare polarizer, and a display apparatus in which a high antiglare property and a high contrast are achieved without using fine particles.

SUMMARY

The present embodiments provide an antiglare optical film that can suppress a feeling of opacity while maintaining an antiglare property and that does not contain fine particles.

First, extensive studies were conducted through experiments to examine whether or not desired structures each having a semispherical shape or the like can be formed on a base member by performing transference by roll-pressing with an embossing roll in which laser engraving is performed on the surface thereof. As a result, it was found that structures each having a semispherical shape or the like can be formed by performing transference by adjusting the temperature and the pressure of the embossing roll.

The transfer temperature and the transfer pressure are determined in accordance with the physical properties of a transparent base member. For example, when TAC is used as the transparent base member, the transfer temperature is preferably in the range of 170° C. to 190° C. The reason for this is as follows. If the transfer temperature is lower than 170° C., the amount of transfer is insufficient and thus a flat portion is formed. If the transfer temperature exceeds 190° C., thermal wrinkles are readily formed. The transfer pressure is preferably 150 kg/cm or more. The reason for this is as follows. At a transfer pressure lower than this, a flat portion may be formed unless the transfer rate is decreased to several meters per minute or less. Consequently, the processing rate is not increased and thus productivity is poor.

Furthermore, it was found that a continuous, smooth wave surface is obtained so as to approximately conform to the shape of the structures of the base member merely by applying a hard-coating agent onto the transferred surface, drying and curing the hard-coating agent, and controlling the coating thickness of the hard-coating agent, thus achieving a substantially ideal diffuse reflection property.

The coating thickness is preferably in the range of 3 μm to 20 μm. The reason for this is as follows. If the thickness is less than 3 μm, the hardness is low and the resulting surface is readily scratched. If the thickness exceeds 20 μm, warpage increases, and the warpage tend to remain even after the base member is formed into a polarizing plate.

To solve the above-described problems, a first embodiment provides an optical film including:

a base member having convex structures that are two-dimensionally and orderly arranged on a surface thereof; and a hard-coating layer provided on the surface of the base member, the surface having the arranged structures thereon, wherein a continuous wave surface is provided on a surface of the hard-coating layer so as to approximately conform to the shape of the structures of the surface of the base member, a maximum amplitude A and a minimum wavelength $\lambda$ of the continuous wave surface are each substantially uniform, and a ratio (A/$\lambda$) of the maximum amplitude A to the minimum wavelength $\lambda$ is more than 0.002 and 0.011 or less.

A second embodiment provides a method for manufacturing an optical film including the steps of:

forming convex structures two-dimensionally and orderly on a surface of a base member; and forming a hard-coating layer by applying a hard-coating agent onto the surface of the base member, the surface having the structures thereon, and curing the hard-coating agent, wherein a continuous wave surface is formed on a surface of the hard-coating layer so as to approximately conform to the shape of the structures of the surface of the base member, a maximum amplitude A and a minimum wavelength $\lambda$ of the continuous wave surface are each substantially uniform, and a ratio (A/$\lambda$) of the maximum amplitude A to the minimum wavelength $\lambda$ is more than 0.002 and 0.011 or less.

A third embodiment provides an antiglare polarizer including:

a polarizer; and an optical film provided on the polarizer, wherein the optical film includes a base member having convex structures that are two-dimensionally and orderly arranged on a surface thereof, and a hard-coating layer provided on the surface of the base member, the surface having the arranged structures thereon, a continuous wave surface is provided on a surface of the hard-coating layer so as to approximately conform to the shape of the structures of the surface of the base member, a maximum amplitude A and a minimum wavelength $\lambda$ of the continuous wave surface are each substantially uniform, and a ratio (A/$\lambda$) of the maximum amplitude A to the minimum wavelength $\lambda$ is more than 0.002 and 0.011 or less.

A fourth embodiment provides a display apparatus including:

a display unit that displays an image; and an optical film provided on a display surface side of the display unit, wherein the optical film includes a base member having convex structures that are two-dimensionally and orderly arranged on a surface thereof, and a hard-coating layer provided on the surface of the base member, the surface having the arranged structures thereon, a continuous wave surface is provided on a surface of the hard-coating layer so as to approximately conform to the shape of the structures of the surface of the base member, a maximum amplitude A and a minimum wavelength $\lambda$ of the continuous wave surface are each substantially uniform, and a ratio (A/$\lambda$) of the maximum amplitude A to the minimum wavelength $\lambda$ is more than 0.002 and 0.011 or less.

In the present embodiments, a continuous wave surface, the shape of which approximately conforms to that of the structures of a surface of a base member, is formed on a surface of a hard-coating layer, each of the maximum amplitude A and the minimum wavelength $\lambda$ of the continuous wave surface is substantially uniform, and a ratio (A/$\lambda$) of the maximum amplitude A to the minimum wavelength $\lambda$ is in the range of more than 0.002 and 0.011 or less. Thus, a smooth wave can be formed on the surface of the hard-coating layer, and light can be diffused by this wave. Furthermore, since the hard-coating layer does not contain fine particles, optical transparency can be improved, as compared with conventional optical films in which an antiglare property is exhibited by protruding fine particles from a surface, and thus a high contrast can be achieved.

As described above, light can be diffused by a smooth wave on a surface of a hard-coating layer and the hard-coating layer has high optical transparency. Thus, an optical film having a high antiglare property and high contrast can be realized.

Additional features and advantages are described herein, and will be apparent from, the following Detailed Description and the figures.

DETAILED DESCRIPTION

Embodiments will now be described with reference to the drawings. Note that, in all the drawings illustrating the embodiments described below, the same or corresponding components are assigned the same characters.

(1) First Embodiment (1-1) Structure of Liquid Crystal Display Apparatus

Figure 1:
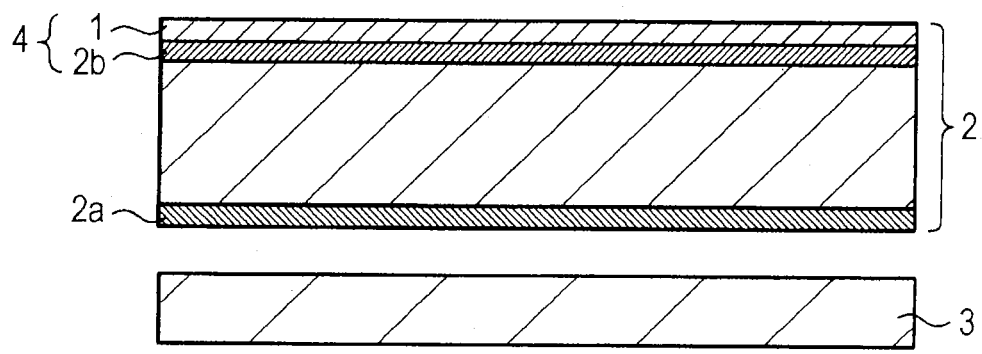
FIG. 1 is a schematic cross-sectional view showing one example of the structure of a liquid crystal display apparatus according to a first embodiment.

FIG. 1 shows one example of the structure of a liquid crystal display apparatus according to a first embodiment. As shown in FIG. 1, the liquid crystal display apparatus includes a backlight 3 that emits light and a liquid crystal panel 2 that temporally and spatially modulates light emitted from the backlight 3 to display an image. Polarizers 2a and 2b are respectively provided on two surfaces of the liquid crystal panel 2. An optical film 1 is provided on the polarizer 2b provided at the display surface side of the liquid crystal panel 2. In the present invention, the polarizer 2b having the optical film 1 on one main surface thereof is referred to as an antiglare polarizer 4.

For example, a direct-type backlight, an edge-type backlight, or a planar light source-type backlight can be used as the backlight 3. The backlight 3 includes, for example, a light source, a reflecting plate, an optical film, and the like. For example, a cold cathode fluorescent lamp (CCFL), a hot cathode fluorescent lamp (HCFL), an organic electroluminescence (OEL), a light emitting diode (LED), or the like is used as the light source.

Examples of the display mode that can be used for the liquid crystal panel 2 include a twisted nematic (TN) mode, a super twisted nematic (STN) mode, a vertically aligned (VA) mode, an in-plane switching (IPS) mode, an optically compensated birefringence (OCB) mode, a ferroelectric liquid crystal (FLC) mode, a polymer dispersed liquid crystal (PDLC) mode, and a phase change guest host (PCGH) mode.

The polarizers 2a and 2b are respectively provided on two surfaces of the liquid crystal panel 2 so that transmission axes thereof are orthogonal to each other, for example. Each of the polarizers 2a and 2b allows only one of orthogonal polarized components of incident light to pass and blocks the other component by absorption. Each of the polarizers 2a and 2b may be a uniaxially stretched hydrophilic polymer film such as a polyvinyl alcohol-based film, a partially formalized polyvinyl alcohol-based film, an ethylene-vinyl acetate copolymer-based partially saponified film, or the like, with a dichroic substance, such as iodine or a dichroic dye, adsorbed thereto.

(1-2) Structure of Optical Film

Figure 2:
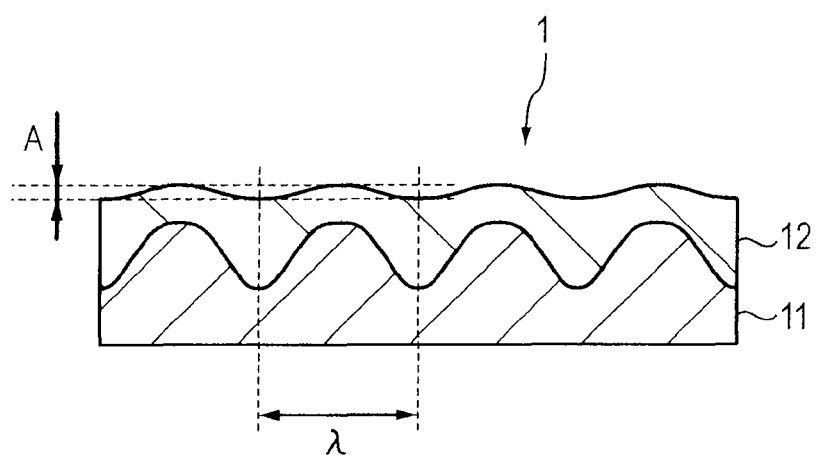
FIG. 2 is a schematic cross-sectional view showing one example of the structure of an optical film according to the first embodiment.

FIG. 2 shows one example of the structure of an optical film according to the first embodiment. As shown in FIG. 2, the optical film 1 includes a base member 11 and a hard-coating layer 12 provided on the base member 11.

The total light transmittance is preferably 92% or more. This is because, in the case of 92% or more, the quantity of light emitted from the backlight can be maintained without degrading the transparency of the transparent base member. The haze is preferably 1.5% or less. This is because, in the case of 1.5% or less, scattering of light emitted from the backlight and scattering of surface reflected light can be suppressed and thus black is visible as black. The internal haze is preferably 0.5% or less. This is because, in the case of 0.5% or less, scattering of light emitted from the backlight can be similarly suppressed and colors are visible as colors closer to natural colors. The opacity is preferably 0.7% or less. This is because, in the case of 0.7% or less, similarly, black is visible as black. Note that the haze is the sum of the surface haze and the internal haze.

(Base Member)

The base member 11 is a plastic base member having transparency. As for the shape of the base member 11, for example, a film, sheet, or substrate having transparency can be used. For example, known polymer materials can be used as the material for the base member 11. Specific examples of the known polymer materials include triacetyl cellulose (TAC), polyesters (TPEE), polyethylene terephthalate (PET), polyimides (PI), polyamides (PA), aramids, polyethylene (PE), polyacrylates, polyethersulfone, polysulfone, polypropylene (PP), diacetyl cellulose, polyvinyl chloride, acrylic resins (PMMA), polycarbonate (PC), epoxy resins, urea resins, urethane resins, melamine resins, cycloolefin-based resins (e.g., ZEONOR), and styrene/butadiene copolymers (SBC). The thickness of the base member 11 is preferably 38 to 100 µm from the standpoint of productivity but is not particularly limited to this range.

Furthermore, the base member 11 preferably has a function as a protective film of the polarizer 2b. This is because another protective film need not be separately provided on the polarizer 2b, and thus the thickness of the polarizer 2b having the optical film 1 can be reduced.

Figure 3A:
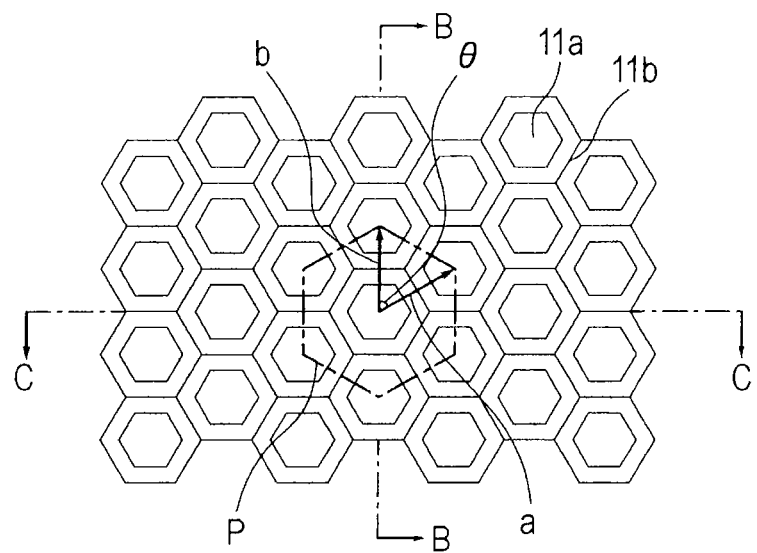
FIG. 3A is a plan view showing an example of a concavo-convex shape of a base material.
Figure 3B:
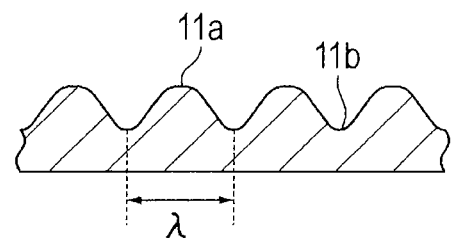
FIG. 3B is a cross-sectional view taken along line B-B of the base member shown in FIG. 3A.
Figure 3C:
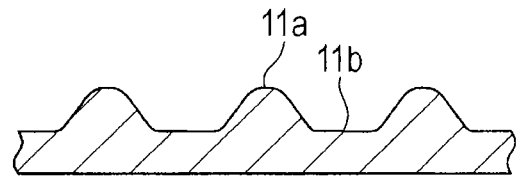
FIG. 3C is a cross-sectional view taken along line C-C of the base member shown in FIG. 3A.

FIG. 3 shows an example of a concavo-convex shape of a surface of a base material. As shown in FIG. 3, the base member 11 has a concavo-convex shape on one main surface on which the hard-coating layer 12 is provided. Specifically, convex structures 11a are two-dimensionally and orderly arranged on the surface of the base member 11. Specific examples of an arrangement pattern P of the structures 11a include a quadrangular pattern, a hexagonal pattern, and an octagonal pattern. Note that FIG. 3 shows an example in which the structures 11a are arranged in the form of a hexagonal pattern. The structures 11a preferably have a substantially uniform height. The structures 11a are orderly arranged in two different directions a and b when viewed from a vertex of any one of the structures 11a. An angle θ formed by the direction a and the direction b is adequately selected in accordance with the desired arrangement pattern P. For example, in the case where the arrangement pattern P is a hexagonal pattern as shown in FIG. 3, the angle θ formed by the direction a and the direction b is 60 degrees. In addition, cross sections of the hard-coating layer cut along the two different directions preferably have continuous wave-like shapes.

Examples of the shape of the convex structures 11a include semispherical shapes (dome shapes), pyramidal shapes, and columnar shapes. However, the shape of the convex structures 11a is not limited to these shapes and can be adequately selected in accordance with desired optical properties. Examples of the pyramidal shapes include cone shapes, truncated cone shapes, and polygonal pyramid shapes. Examples of the polygonal pyramid shapes include a quadrangular pyramid, a hexagonal pyramid, and an octagonal pyramid. Examples of the columnar shapes include cylindrical shapes and polygonal columnar shapes. Examples of the polygonal columnar shapes include a quadrangular column, a hexagonal column, and an octagonal column. In addition, shape anisotropy may be imparted to the structures 11a. From the standpoint of adjusting optical properties of the display apparatus in the horizontal direction and in the vertical direction, for example, shape anisotropy is preferably imparted in two orthogonal directions among in-plane directions of the base member 11. Specific examples of the shape of the structures 11a having shape anisotropy include elliptical columnar shapes, semielliptic spherical shapes, truncated elliptical cone shapes, and polygonal columnar shapes and polygonal pyramid shapes that are stretched in one direction.

For example, a V cross-sectional shape, a U cross-sectional shape, or the like can be used as the shape of a space 11b between structures. However, the shape is not limited thereto and can be adequately selected in accordance with desired optical properties. In addition, shape anisotropy may be imparted to the shape of the space 11b between structures. From the standpoint of adjusting optical properties of the display apparatus in the horizontal direction and in the vertical direction, for example, shape anisotropy is preferably imparted in two orthogonal directions among in-plane directions of the base member 11. Specifically, for example, the distance between the spaces 11b between structures may be varied in different directions. For example, the distance between the spaces 11b between structures in one direction may be larger than the distance between the spaces 11b between structures in the other direction, the two directions being orthogonal to each other in the plane.

(Hard-Coating Layer)

The hard-coating layer 12 provides the surface of the base member 11, i.e., the surface of an optical film, a display apparatus, or the like with both abrasion resistance and an antiglare property and is a polymer resin layer harder than the base member 11. The surface of the hard-coating layer is provided with a continuous wave surface, the shape of which approximately conforms to that of the structures 11a of the base member 11. The positions of concave portions and convex portions of the hard-coating layer 12 correspond to the positions of concave portions and convex portions, respectively, of the base member 11. The amounts of concavity and convexity on the surface of the hard-coating layer are smaller than the amounts of concavity and convexity on the surface of the base member. The larger the coating thickness of the hard-coating layer, the smaller the amounts of concavity and convexity.

Each of the maximum amplitude A and the minimum wavelength λ of the continuous wave surface is substantially uniform. Accordingly, generation of a flat portion can be suppressed over the entire coated surface when the hard-coating layer is applied and thus an antiglare property can be maintained. Furthermore, a ratio (A/λ) of the maximum amplitude A to the minimum wavelength λ is more than 0.002 and 0.011 or less. The reason for this is as follows. In the case of a ratio of 0.002 or less, the antiglare property tends to decrease, and in the case of a ratio exceeding 0.011, the opacity tends to increase. In the present embodiment, the term "continuous wave surface" means that there are not any discontinuous points or steps on the surface of the hard-coating layer and the surface is smoothly connected, and specifically, differentiation can be performed at any point on the surface of the hard-coating layer. In addition, the term "minimum wavelength λ" refers to the minimum distance among distances between vertexes of adjacent structures 11a. In addition, the term "maximum amplitude A" refers to the height of the vertex of a convex portion when the bottom surface of the concave portions of the wave surface is taken as a reference.

A cross section of the hard-coating layer 12 obtained by cutting so as to pass through the vertexes of adjacent structures 11a preferably has a continuous wave-like shape, and further preferably has a sinusoidal wave-like shape. This is because a good diffuse reflection property can be achieved. In the present invention, the term "sinusoidal wave-like shape" also includes substantially sinusoidal wave-like shapes.

(1-3) Embossing Transfer Apparatus

Figure 4:
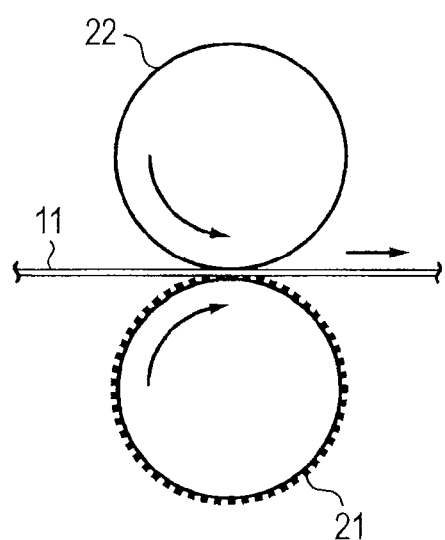
FIG. 4 is a schematic view showing an example of the structure of an embossing transfer apparatus used in a method for manufacturing an optical film according to the first embodiment.

Next, an embossing transfer apparatus for forming the base member 11 having the above-described structure will be described with reference to FIG. 4. As shown in FIG. 4, the embossing transfer apparatus includes an embossing roll 21 and a back roll 22.

For example, a heating roll such as an induction heating jacket roll, a heat-medium-circulating roll, or a heater-installed roll can be used as the embossing roll 21. As a method for embossing the surface of the roll, various methods such as laser engraving, sand blasting, machine engraving, or photo-etching can be employed, but laser engraving is preferable. The reason for this is as follows. It is difficult for sand blasting to make the depth of concave portions 21a uniform and to form the concave portions 21a two-dimensionally and orderly. It is difficult for machine engraving, photo-etching, or the like to perform engraving at a high density exceeding 250 line/inch. In addition, for ultra high-density engraving exceeding 500 line/inch, the engraving is preferably performed with $CO_2$ laser or YAG laser. From the standpoint that good abrasion durability in long-term use is achieved, hard chromium plating or ceramic spraying is preferable as a surface treatment.

It is necessary to apply a high pressure to the back roll 22 in order to transfer a fine emboss pattern on a surface of the base member. Therefore, the back roll 22 preferably includes, for example, a rubber layer having a rubber hardness of JIS-D 80 degrees or more or a resin layer having a hardness corresponding to this, the rubber layer or the resin layer being provided on a surface of an iron roll, and the surface of the rubber layer or the resin layer is preferably finished by polishing.

Furthermore, preferably, cooling is performed by circulating a cooling medium inside the iron roll of the back roll 21 or the surface of the rubber layer or the resin layer is cooled using a cooling roll or a cooling nozzle. The reason for this is that the phenomenon can be prevented in which the temperature of the rubber layer or the resin layer of the back roll 22 is increased by successive heat transfer from the embossing roll 21 during an embossing process, resulting in softening or melting of the base member 11, and that a successive embossing transfer can be performed.

Figure 5A:
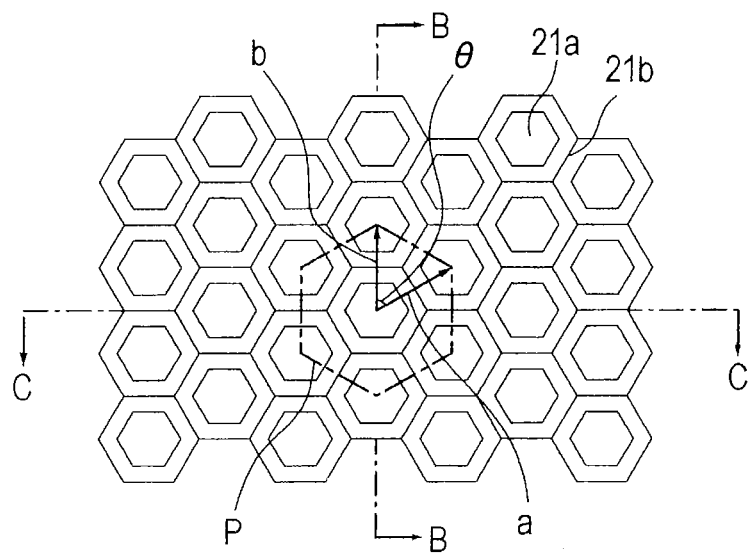
FIG. 5A is a plan view showing one example of a concavo-convex shape of an embossing roll.
Figure 5B:
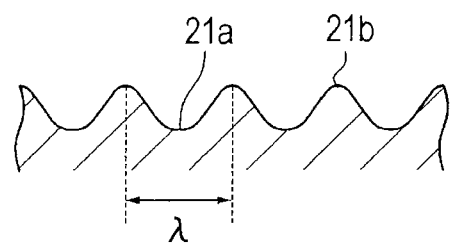
FIG. 5B is a cross-sectional view taken along line B-B of the embossing roll shown in FIG. 5A.
Figure 5C:
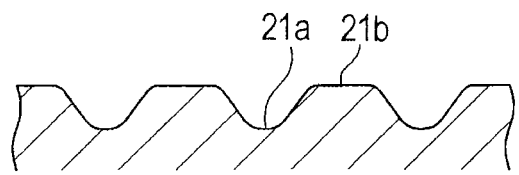
FIG. 5C is a cross-sectional view taken along line C-C of the embossing roll shown in FIG. 5A.

FIG. 5 shows one example of a concavo-convex shape of an embossing roll. As shown in FIG. 5, an embossing roll 21 has a concavo-convex shape (emboss pattern) on a cylindrical surface thereof Specifically, concave portions 21a for forming structures 11a on a base member 11 are provided on the surface of the embossing roll 21. The concave portions 21a are arranged on the surface of the embossing roll 21 two-dimensionally and orderly. Specific examples of an arrangement pattern P of the concave portions 21a include a quadrangular pattern, a hexagonal pattern, and an octagonal pattern. Note that FIG. 5 shows an example in which the structures 11a are arranged in the form of a hexagonal pattern. In addition, the structures 11a are orderly arranged in two different directions a and b when viewed from a vertex of any one of the structures 11a. An angle θ formed by the direction a and the direction b is adequately selected in accordance with the desired arrangement pattern P. For example, in the case where the arrangement pattern P is a hexagonal pattern as shown in FIG. 5, the angle θ formed by the direction a and the direction b is 60 degrees.

Examples of the shape of the concave portions 21a forming the structures 11a include semispherical shapes (dome shapes), pyramidal shapes, and columnar shapes. However, the shape of the concave portions 21a is not limited to these shapes and can be adequately selected in accordance with desired optical properties. Examples of the pyramidal shapes include cone shapes, truncated cone shapes, and polygonal pyramid shapes. Examples of the polygonal pyramid shapes include a quadrangular pyramid, a hexagonal pyramid, and an octagonal pyramid. Examples of the columnar shapes include cylindrical shapes and polygonal columnar shapes. Examples of the polygonal columnar shapes include a quadrangular column, a hexagonal column, and an octagonal column. In addition, shape anisotropy may be imparted to the concave portions 21a. From the standpoint of adjusting optical properties of the display apparatus in the horizontal direction and in the vertical direction, for example, shape anisotropy is preferably imparted in two orthogonal directions among in-plane directions of the embossing roll 21, e.g., in the circumferential direction and in the height direction. Specifically, examples of the shape of the concave portions 21a having shape anisotropy include elliptical columnar shapes, semielliptic spherical shapes, truncated elliptical cone shapes, and polygonal columnar shapes and polygonal pyramid shapes that are stretched in one direction.

For example, a V cross-sectional shape, a U cross-sectional shape, or the like can be used as the shape of a space 21b between concave portions. However, the shape is not limited thereto and can be adequately selected in accordance with desired optical properties of the optical film 1. In addition, the shape of the space 21b between concave portions may not need shape anisotropy. From the standpoint of adjusting optical properties of the display apparatus in the horizontal direction and in the vertical direction, for example, shape anisotropy is preferably imparted in two orthogonal directions, e.g., in the circumferential direction and in the height direction, among in-plane directions of the embossing roll 21. Specifically, for example, the distance between the spaces 21b between concave portions may be varied in different directions. For example, the distance between the spaces 21b between concave portions in one direction may be larger than the distance between the spaces 21b between concave portions in the other direction, the two directions being orthogonal to each other in the plane.

(1-4) Method for Manufacturing Optical Film

Next, an example of a method for manufacturing an optical film having the above-described structure will be described with reference to FIG. 6. Each step described below is preferably performed in a roll-to-roll process in order to improve productivity and to reduce the cost.

(Transfer Step)

Figure 6A:
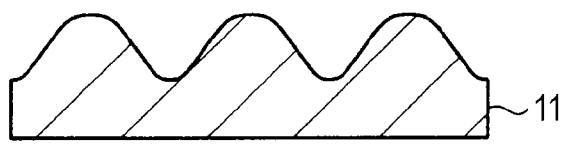
FIGS. 6A to 6C are process views showing an example of the method for manufacturing an optical film according to the first embodiment.

First, a base member 11 is heated and pressed while continuously rotating the embossing roll 21 and the back roll 22 in a state in which the base member 11 is sandwiched therebetween using the embossing transfer apparatus shown in FIG. 4, thereby transferring a concavo-convex shape onto the surface of the base member 11. Thus, as shown in FIG. 6A, structures 11a are formed on the surface of the base member 11 two-dimensionally and orderly.

(Coating Material Preparation Step)

Next, for example, a resin, a photopolymerization initiator, and a solvent are mixed to prepare a hard-coating agent (coating material). Furthermore, a photostabilizer, an ultraviolet absorber, an antistatic agent, a flame retardant, an antioxidant, a viscosity modifier, and the like may be added, if necessary.

From the standpoint of ease of manufacturing, the resin preferably contains, as a main component, at least one of ionizing radiation-curable resins that are cured by light, an electron beam, or the like and thermosetting resins that are cured by heat. Photosensitive resins that are cured by ultraviolet rays are most preferable. Examples of such a photosensitive resin that can be used include acrylate resins such as urethane acrylates, epoxy acrylates, polyester acrylates, polyol acrylates, polyether acrylates, and melamine acrylates. For example, a urethane acrylate resin is obtained by allowing a polyester polyol to react with an isocyanate monomer or prepolymer and then allowing the resulting reaction product to react with a hydroxyl-group-containing acrylate or methacrylate monomer. Characteristics after curing can be adequately selected. For example, a resin that exhibits a good light-transmitting property is preferable in view of an image-transmitting property, and a resin that has a high hardness is preferable in view of scratch resistance. Note that the photosensitive resin is not particularly limited to the above examples, and any photosensitive resin having a light-transmitting property can be used. However, a resin that does not cause a significant change in the hue of transmitted light and the amount of transmitted light due to coloring and haze is preferable. In particular, a resin having a refractive index that is not significantly different from the refractive index of the base member 11 used is preferably used. This is because when a resin having a refractive index significantly different from that of the base member 11 is used, reflection occurs at an interface with the base member and the resulting base member becomes opaque.

Preferably, a urethane resin, an acrylic resin, a methacrylic resin, a styrene resin, a melamine resin, or a cellulosic resin that becomes a solid by drying, furthermore, an ionizing radiation-curable oligomer, or a thermosetting oligomer is appropriately mixed with the photosensitive resin and used. The hardness and curling of the hard-coating layer 12 can be controlled by appropriately mixing such resins. The resins are not limited to the above examples. For example, a polymer that has an ionizing radiation functional group, such as an acrylic double bond, or a thermosetting group, such as an —OH group, can be used.

Examples of the photopolymerization initiator contained in the photosensitive resin include benzophenone derivatives, acetophenone derivatives, and anthraquinone derivatives. These may be used alone or in combinations. A component that improves coating film formation, e.g., an acrylic resin or the like, may further be appropriately selected and blended with the photosensitive resin.

A solvent that dissolves the resin material used, that has good wettability with the base member 11, and that does not bleach the base member 11 is preferable. Examples thereof include solvents composed of ketones or carboxylic acid esters such as acetone, diethyl ketone, dipropyl ketone, methyl ethyl ketone, methyl butyl ketone, methyl isobutyl ketone, cyclohexanone, methyl formate, ethyl formate, propyl formate, isopropyl formate, butyl formate, methyl acetate, ethyl acetate, propyl acetate, isopropyl acetate, butyl acetate, isobutyl acetate, secondary butyl acetate, amyl acetate, isoamyl acetate, secondary amyl acetate, methyl propionate, ethyl propionate, methyl butyrate, ethyl butyrate, and methyl lactate; and alcohols such as methanol, ethanol, isopropanol, n-butanol, sec-butanol, and tert-butanol. These solvents may be used alone or as a mixture of two components or more. Furthermore, solvents other than those exemplified above may be added in an amount that does not impair the performance of the resin composition.

As the antistatic agent, for example, electrically conductive carbon, inorganic fine particles, an inorganic fine powder, a surfactant, an ionic liquid, or the like can be used. These antistatic agents may be used alone or in combinations of two or more. Examples of the materials for the inorganic fine particles and inorganic fine powder include materials containing an electrically conductive metal oxide as a main component. As the electrically conductive metal oxides, for example, tin oxide, indium oxide, antimony-doped tin oxide (ATO), indium-doped tin oxide (ITO), antimony zinc oxide, or the like can be used.

Examples of the surfactant include anionic or amphoteric compounds such as carboxylic acid compounds and phosphate salts; cationic compounds such as amine compounds and quaternary ammonium salts; nonionic compounds such as fatty acid-polyhydric alcohol ester compounds and polyoxyethylene adducts; and polymer compounds such as polyacrylic acid derivatives. Ionic liquids are molten salts that are liquid at room temperature. Ionic liquids that have compatibility with the solvent and the resin and that are present in a state compatible with the resin even after the solvent is volatilized in the drying step described below are preferable. Specific examples of the cationic species of ion pairs include aliphatic quaternary ammonium cations composed of nitrogen-containing oniums, quaternary ammonium cations having nitrogen-containing heterocyclic structures, phosphonium cations composed of phosphorus-containing onium salts, and sulfonium cations composed of sulfur-containing oniums. Examples of the anionic species of ion pairs include halogen anions, organic carboxyl group anions, and organic fluorine-containing anions. In particular, the anion is preferably an organic fluorine-containing anion such as tris(trifluoromethylsulfonyl)nitric acid because the anion readily forms a liquid ion pair at normal temperature. In addition, the ionic liquids may be used alone, or several types of ionic liquids may be used in combinations.

(Coating Step)

Figure 6B:
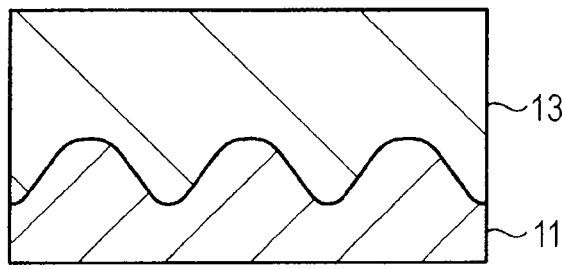

Next, as shown in FIG. 6B, a prepared hard-coating agent 13 is coated onto the base member 11. Although the liquid level of the coated hard-coating agent 13 is leveled, the thickness between the liquid level and the concavo-convex shape on the surface of the base member is distributed and thus a smooth concavo-convex gas-liquid interface is formed by a volume change during drying. As a result, an optical film 1 in which the amounts of surface concavity and convexity of the hard-coating layer 12 are smaller than the amounts of surface concavity and convexity of the base member 11 can be produced. In addition, the amounts of surface concavity and convexity of the base member 11 can control the diffuse reflection property by changing the thickness of the hard-coating agent 13 to be coated. Furthermore, since the surface can be formed in a non-contact manner through the processes ranging from the application to the curing, a defect-free high-quality optical film 1 can be provided.

The coating method is not particularly limited and any known coating method can be employed. Examples of the known coating methods include a micro-gravure coating method, a wire-bar coating method, a direct gravure coating method, a die coating method, a dipping method, a spray coating method, a reverse roll coating method, a curtain coating method, a comma coating method, a knife coating method, and a spin-coating method.

(Drying Step)

Next, the hard-coating agent 13 coated on the base member 11 is dried to volatilize the solvent. The drying conditions are not particularly limited. The drying may be natural drying or artificial drying in which the drying temperature and the drying time are adjusted. However, in the case where the surface of the coating material is exposed to wind during drying, it is preferable that wind ripples do not form on the surface of the coating film. This is because if wind ripples are formed, a desired gently wavy fine concavo-convex shape does not tend to be formed on the surface of the antiglare layer, and thus it becomes difficult to achieve both the antiglare property and the contrast. Furthermore, the drying temperature and the drying time can be appropriately determined on the basis of the boiling point of the solvent contained in the coating material. In such a case, the drying temperature and the drying time are preferably set in the ranges where deformation of the base member 11 due to thermal shrinkage does not occur in consideration of heat resistance of the base member 11.

(Curing Step)

Figure 6C:
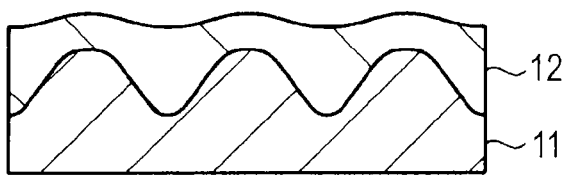

Next, the resin dried on the base member 11 is cured by, for example, irradiation with ionizing radiation or heating. As a result, as shown in FIG. 6C, a smooth wave surface can be formed on the surface of the hard-coating layer 12 in which a structure 11a forms one peak. For example, electron beams, ultraviolet rays, visible rays, gamma rays, electron beams, or the like can be used as the ionizing radiation. Ultraviolet rays are preferable from the standpoint of production equipment. Preferably, the integrated exposure dose is adequately selected in consideration of the curing properties of the resin, suppression of yellowing of the resin and the base member 11, and the like. In addition, the atmosphere of irradiation can be adequately selected in accordance with the state of curing of the resin. Examples of the atmosphere of irradiation include air and an inert gas atmosphere such as nitrogen or argon.

As a result, a target optical film is obtained.

In the first embodiment, a continuous wave surface, the shape of which approximately conforms to that of the structures 11a on the surface of the base member, is formed on the surface of the hard-coating layer, each of the maximum amplitude A and the minimum wavelength λ of the continuous wave surface is substantially uniform, and the ratio (A/λ) of the maximum amplitude A to the minimum wavelength λ is in the range of 0.0025 to 0.011. Thus, a smooth wave can be formed on the surface of the hard-coating layer, and light can be diffused by this wave. Furthermore, since the hard-coating layer 12 does not contain fine particles, optical transparency can be improved, as compared with conventional optical films in which an antiglare property is exhibited by protruding fine particles from a surface, and thus a high contrast can be achieved. Accordingly, an antiglare optical film in which a feeling of opacity can be suppressed while maintaining an antiglare property can be realized without using fine particles. Furthermore, the antiglare property of the optical film can be freely designed by changing the concavo-convex shape of the surface.

Furthermore, in the case where roll pressing is performed using an embossing roll 21 in which a honeycomb of holes with an arrangement of 500 lines/inch (diameter: about 50 μm) and a depth of 5 to 10 μm is formed on the surface thereof by laser engraving, dome-shaped structures 11a each having a transferred convex portion with a thickness of 2 to 6 μm can be formed by performing transference by adjusting the temperature and the pressure of the embossing roll 21. Furthermore, the hard-coating agent 13 is applied onto the transferred surface, dried, and cured, whereby a surface profile having a smooth sinusoidal wave-like shape can be obtained along the concavo-convex shape of the base member 11. In this step, a substantially ideal diffuse reflection property can be achieved simply by controlling the coating thickness. By performing the above-described process, a smooth wave, which is important for realizing a high antiglare property and low opacity, can be formed on the surface of the hard-coating layer. In addition, the diffuse reflection property can be easily controlled. Furthermore, a defect-free optical film has been desired, and such a desire can also be satisfied at the same time.

In addition, to specify the antiglare property (diffuse reflection property), a concavo-convex pattern with a orderly arrangement is formed on the surface of the embossing roll 21. In the case of sand blasting, which is usually employed, since concavities and convexities are three-dimensionally formed, there is no choice but to represent the surface profile in terms of the arithmetic mean roughness. Furthermore, when a hard coating is applied onto such a sand-blasted surface, the antiglare property can be confirmed but there is an adverse effect that small concavities and convexities on a base member are embedded in the hard-coating layer owing to the viscosity and the surface tension of the hard-coat coating material. Accordingly, heretofore, it has been difficult to specify a surface profile that exhibits an antiglare property. In contrast, in the first embodiment, embossing transfer is performed using a concavo-convex pattern plate having a uniform depth and an orderly arrangement, thereby forming protrusions having a uniform height on the surface of the base member, and the coating thickness of the hard-coating agent 13 is changed. Thus, the relationship between the ratio amplitude A/wavelength λ formed on the surface and the antiglare property (diffuse reflection property) can be specified.

In addition, in the case where transfer is performed by sand blasting, the amounts of surface concavity and convexity tend to be nonuniform, and relatively small concavo-convex portions are embedded by the application of the hard-coating and the surface tends to become flat. Accordingly, the coating thickness for exhibiting an antiglare property must be exactly controlled. Also from the standpoint of productivity, more preferably, transfer is performed using an embossing roll having a uniform concavo-convex height.

(2) Second Embodiment

Figure 7:
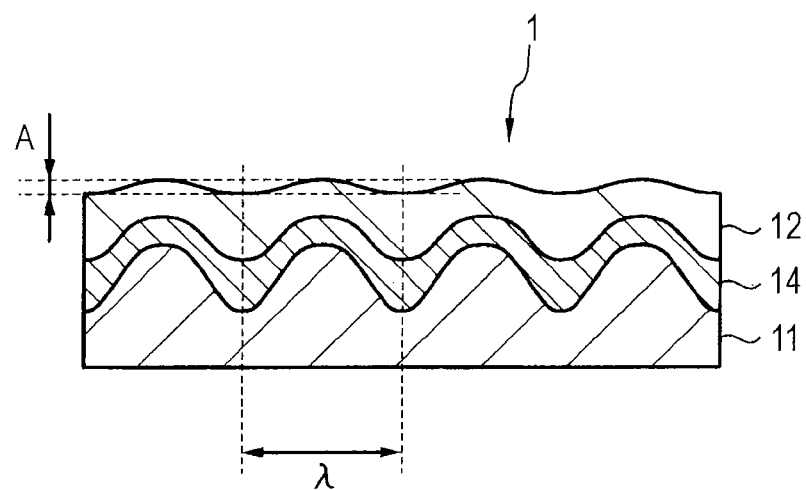
FIG. 7 is a schematic cross-sectional view showing one example of the structure of a liquid crystal display apparatus according to a second embodiment.

FIG. 7 is a cross-sectional view showing one example of the structure of an optical film according to a second embodiment. As shown in FIG. 7, this optical film differs from that of the first embodiment in that an antistatic layer 14 is provided between a base member 11 and a hard-coating layer 12. Since the base member 11 and the hard-coating layer 12 are the same as those in the first embodiment, they are assigned the same reference characters and a description thereof is omitted.

The antistatic layer 14 contains a resin and an antistatic agent. According to need, a photostabilizer, an ultraviolet absorber, an antistatic agent, a flame retardant, an antioxidant, a viscosity modifier, and the like may be incorporated in the antistatic layer. The same resin and antistatic agent as those used in the hard-coating layer 12 in the first embodiment can be used as the resin and the antistatic agent.

In the second embodiment, since the antistatic layer 14 is provided between the base member 11 and the hard-coating layer 12, an optical film that exhibits a high antiglare property, a high contrast, abrasion resistance, and an antistatic function can be obtained.

(3) Third Embodiment

Figure 8:
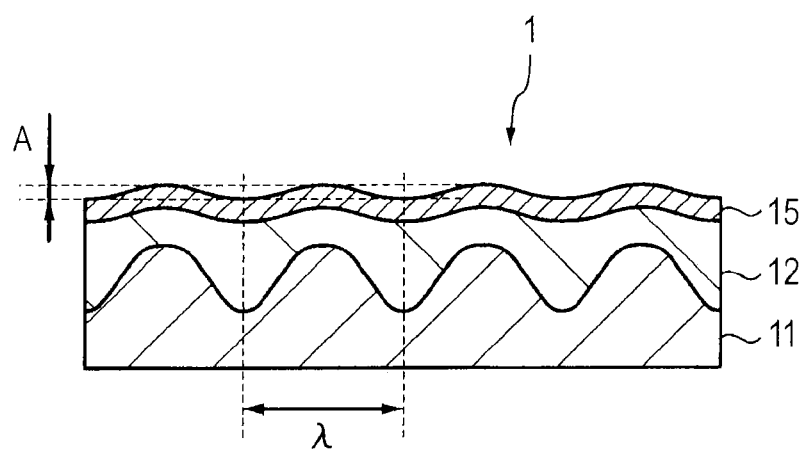
FIG. 8 is a schematic cross-sectional view showing one example of the structure of a liquid crystal display apparatus according to a third embodiment.

FIG. 8 is a cross-sectional view showing one example of the structure of an optical film according to a third embodiment. As shown in FIG. 8, the optical film 1 differs from that of the first embodiment in that an antireflection layer 15 is provided on a hard-coating layer 12. Since a base member 11 and the hard-coating layer 12 are the same as those in the first embodiment, they are assigned the same reference characters and a description thereof is omitted.

For example, a low-refractive-index layer containing hollow fine particles or a low-refractive-index layer containing a fluorine-based resin can be used as the antireflection layer 15. Examples of the hollow fine particles include inorganic fine particles such as silica and alumina, and organic fine particles such as styrene and acryl. Silica fine particles are particularly preferable. Since the hollow fine particles contain air inside, the refractive index thereof is lower than that of normal fine particles. For example, whereas the refractive index of silica fine particles is 1.46, the refractive index of hollow silica fine particles is 1.45 or less.

In the third embodiment, since the antireflection layer 15 is provided on the hard-coating layer 12, the antiglare property can be improved, as compared with the first embodiment.

EXAMPLES

The embodiments will now be specifically described by way of Examples, but the present invention is not limited to only these Examples.

In these Examples, an emboss pattern was transferred onto a film serving as a base member with the embossing transfer apparatus shown in FIG. 4. The embossing transfer apparatus used in the Examples will be described below.

Ceramic spraying of chromium oxide was performed on the surface of an embossing roll. After polishing, $CO_2$ laser engraving of 500 lines/inch was performed to form an embossing plate having a honeycomb of holes with an average diameter of about 50 μm and a depth of 10 μm. In addition, a heater for heating was installed in the embossing roll so that the temperature could be controlled to be 200° C. or higher.

A back roll was prepared by winding a rubber with a hardness of JIS-D 90 degrees on a surface of an iron roll, and finishing by polishing, and a cooling roll for water cooling and an air-cooling nozzle were used therefor. A triacetyl cellulose (TAC) film having a thickness of 80 μm was heated and pressed while continuously rotating the embossing roll and the back roll in a state in which the TAC film was sandwiched therebetween. If the embossing is performed under conditions of a low temperature and a low pressure, merely scratches are formed on the surface of the film along the walls of the emboss pattern with which the film is in contact, and dome-shaped protrusions cannot be formed. In contrast, at a high temperature and a high pressure, although the amount of transfer is large, the film is thermally deformed and a satisfactory product cannot be produced. At a higher line pressure, the amount of transfer increases. However, a uniform line pressure cannot be achieved in the width direction because bending of the roll increases. Accordingly, an economical decision should be made. Thus, it is important that optimum embossing conditions be found in consideration of physical properties and the dimensions of the base member.

As for a concavo-convex pattern formed on the surface of the embossing roll, in the Examples, a concavo-convex pattern with an orderly arrangement was formed in order to specify the antiglare property (diffuse reflection property). In the case of sand blasting, which is usually employed, since concavities and convexities are three-dimensionally formed, there is no choice but to represent the surface profile in terms of the arithmetic mean roughness. Furthermore, when a hard coating is applied onto such a sand-blasted surface, the antiglare property can be confirmed but there is an adverse effect that small concavities and convexities on a film are embedded in the hard-coating layer owing to the viscosity and the surface tension of the hard-coating agent. Accordingly, heretofore, it has been difficult to specify a surface profile that exhibits an antiglare property.

In the Examples, embossing transfer was performed using a concavo-convex pattern plate with an orderly arrangement and a uniform depth to form structures having a uniform height on the surface of the film. The relationship between the ratio maximum amplitude A/minimum wavelength λ formed on the surface and the antiglare property (diffuse reflection property) could be specified by changing the coating thickness of the hard-coating layer.

Example 1

First, a triacetyl cellulose (TAC) film having a thickness of 80 μm was nipped at a line pressure of 2,000 N/cm while continuously rotating an embossing roll heated at 180° C. and a back roll cooled at 50° C. in a state in which the TAC film was sandwiched therebetween. Thus, a concavo-convex shape of the embossing roll was continuously transferred onto the surface of the TAC film. Subsequently, 80 parts by weight of an acryl urethane oligomer, 20 parts by weight of a dry-curable acrylic polymer, and 5 parts by weight of a reaction initiator IRG-184 were mixed with butyl acetate to prepare a hard-coating agent. The hard-coating agent was applied onto the concavo-convex surface of the TAC film with a wire bar. In this step, by appropriately selecting the combination of the gauge of the wire bar and the resin solid content of the hard-coating agent, the ratio maximum amplitude A/minimum wavelength λ after drying and curing of the hard-coating agent was controlled to be 0.0108. Next, the solvent was vaporized in a drying oven at 80°. Subsequently, the resulting film was transferred onto an ultraviolet curing oven and ultraviolet ray curing was conducted at an output of 160 W and an integrated quantity of light of 300 mJ/cm². As a result, a target optical film was prepared.

Example 2

An optical film was prepared as in Example 1 except that the combination of the gauge of the wire bar and the resin solid content of the hard-coating agent was selected such that the ratio maximum amplitude A/minimum wavelength λ was 0.0098.

Example 3

An optical film was prepared as in Example 1 except that the combination of the gauge of the wire bar and the resin solid content of the hard-coating agent was selected such that the ratio maximum amplitude A/minimum wavelength λ was 0.0071.

Example 4

An optical film was prepared as in Example 1 except that the combination of the gauge of the wire bar and the resin solid content of the hard-coating agent was selected such that the ratio maximum amplitude A/minimum wavelength λ was 0.0051.

Example 5

An optical film was prepared as in Example 1 except that the combination of the gauge of the wire bar and the resin solid content of the hard-coating agent was selected such that the ratio maximum amplitude A/minimum wavelength λ was 0.0027.

Example 6

First, a film onto which the concavo-convex shape was transferred was obtained as in Example 1. Next, antimony-doped tin oxide (ATO) having a particle diameter of 30 nm and a urethane acrylic oligomer, which is a UV resin, were mixed at a volume ratio of 1:1 to obtain a dispersion coating material (IPA dispersion). This dispersion coating material was applied onto a TAC film such that the average film thickness after drying was 300 nm and dried to form an antistatic layer. Next, the hard-coating agent was applied onto the TAC film and cured as in Example 1 to prepare an optical film.

Example 7

One hundred parts by weight of a UV-curable urethane acrylic oligomer, 5 parts by weight of a reaction initiator IRG-184, and 40 parts by weight of antimony pentoxide fine particles (particle diameter: 30 nm) were added to a mixed solvent of MIBK/IPA=1/1 such that the solid content was 40%, and mixed and stirred to obtain a hard-coating agent. An optical film was prepared as in Example 1 except that this hard-coating agent was used.

Comparative Example 1

Five parts by weight of styrene fine particles having a particle diameter of 5 to 7 μm and an average particle diameter of 6 μm, 100 parts by weight of an ultraviolet-curable tetrafunctional urethane acrylic oligomer, and 5 parts by weight of Irgacure 184 serving as a photoreaction initiator were added to tertiary butanol, and the resulting mixture was stirred to prepare a 40% butanol solution. Subsequently, the solution was filtered with a mesh filter with an opening diameter of 50 μm to prepare a coating material. Next, the filtered coating material was applied onto a TAC film having a thickness of 80 μm with a gravure coater, and the film was then dried in a drying oven in which the drying temperature was set to 80° C. Subsequently, the film was continuously transferred from the drying oven to an ultraviolet curing oven and irradiated with ultraviolet rays under conditions of an output of 160 W and an integrated quantity of light of 300 mJ/cm², thus forming, on the TAC film, an antiglare film having an average film thickness after curing of 8 μm. Thus, a target optical film was prepared.

Comparative Example 2

An optical film was prepared as in Example 1 except that the step of applying the hard-coating agent was omitted.

Comparative Example 3

An optical film was prepared as in Example 1 except that the combination of the gauge of the wire bar and the resin solid content of the hard-coating agent was selected such that the ratio maximum amplitude A/minimum wavelength λ was 0.0162.

Comparative Example 4

An optical film was prepared as in Example 1 except that the combination of the gauge of the wire bar and the resin solid content of the hard-coating agent was selected such that the ratio maximum amplitude A/minimum wavelength λ was 0.0137.

Comparative Example 5

An optical film was prepared as in Example 1 except that the combination of the gauge of the wire bar and the resin solid content of the hard-coating agent was selected such that the ratio maximum amplitude A/minimum wavelength λ was 0.0127.

Comparative Example 6

An optical film was prepared as in Example 1 except that the combination of the gauge of the wire bar and the resin solid content of the hard-coating agent was selected such that the ratio maximum amplitude A/minimum wavelength λ was 0.0020.

The concavo-convex shape (maximum amplitude A/minimum wavelength λ), the diffuse reflection property, the opacity, the antiglare property, the total light transmittance, the haze, and the internal haze of the optical films of Examples and Comparative Examples prepared as described above were measured and evaluated.

<Evaluation of Concavo-Convex Shape>

Figure 9:
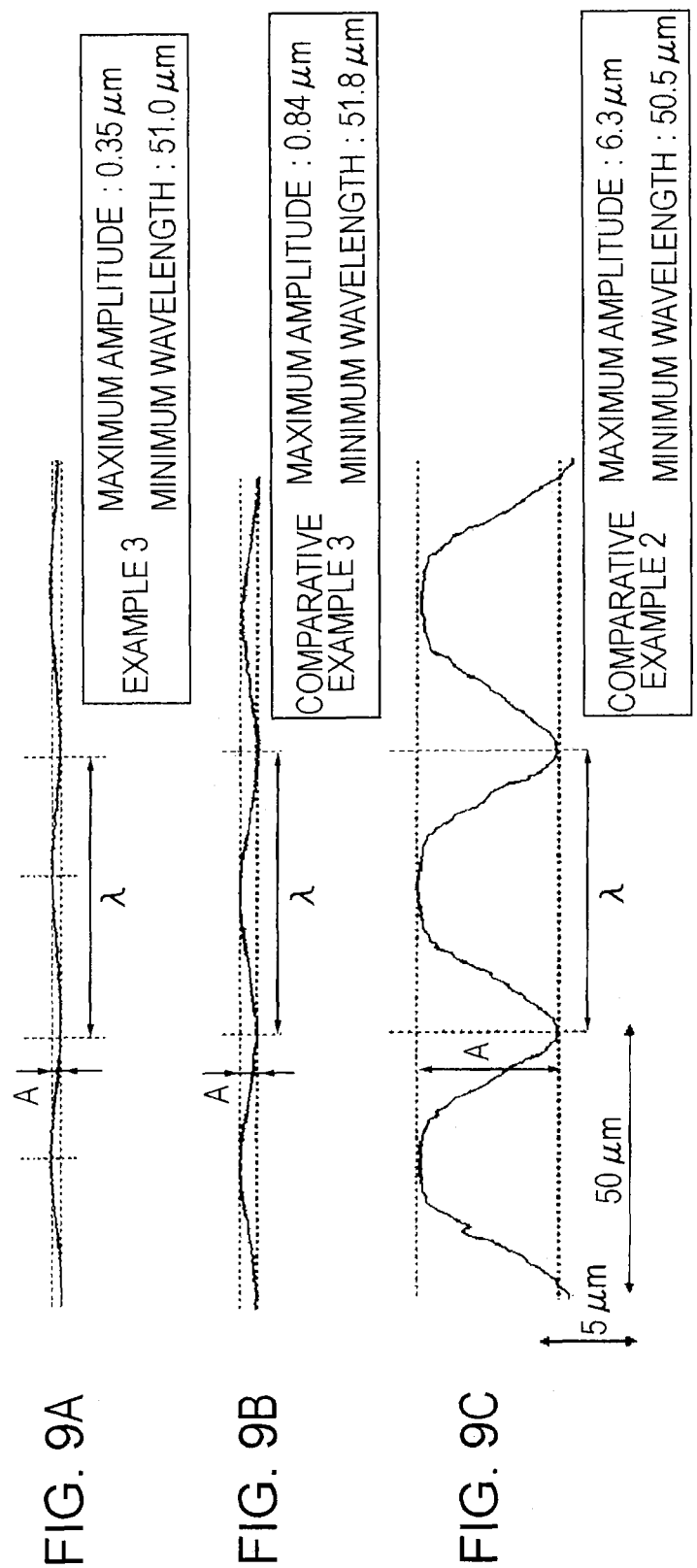
FIGS. 9A to 9C are charts showing cross-sectional profiles of optical films of Example 3, Comparative Example 2, and Comparative Example 3.
Figure 10:
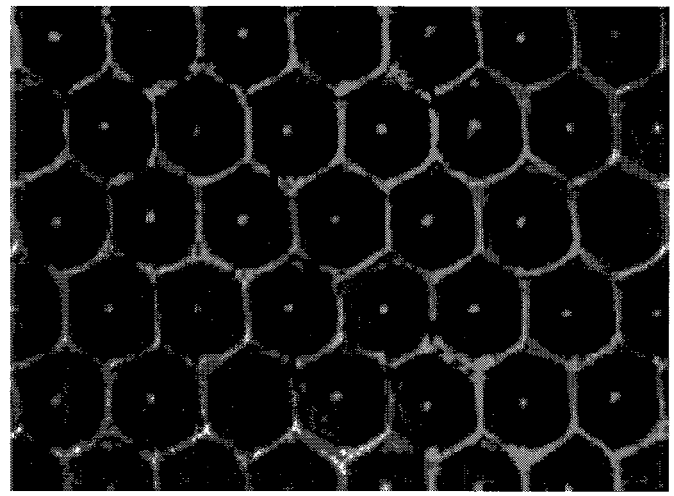
FIG. 10 is a photograph showing an emboss pattern of an embossing roll.
Figure 11:
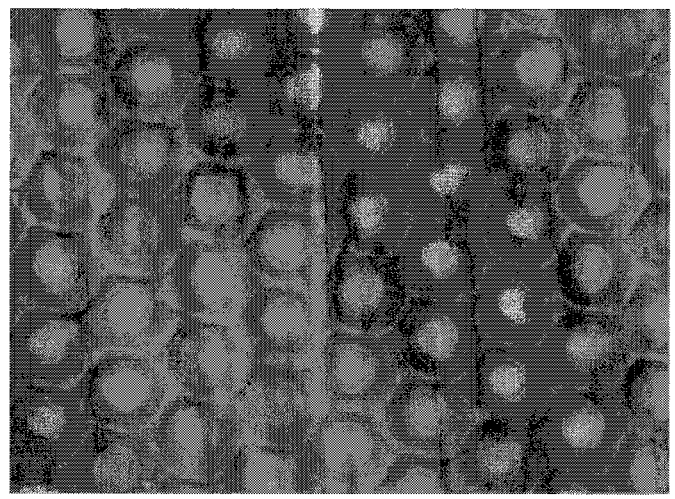
FIG. 11 is a photograph showing an emboss pattern of an optical film of Example 1.

The concavo-convex shape, the height difference, the amplitude, and the ratio maximum amplitude A/minimum wavelength λ were measured with a laser microscope produced by Lasertec Corporation. The results are shown in Table 1. Furthermore, the measured profiles of Example 3, Comparative Example 2, and Comparative Example 3 are shown in FIG. 9 as typical profile examples. In addition, photographs of the emboss pattern of the embossing roll used in the embossing transfer of the TAC film and the emboss pattern of the optical film of Example 1 were taken. The results are shown in FIG. 10 and FIG. 11, respectively.

<Evaluation of Diffuse Reflection Property>

Figure 12:
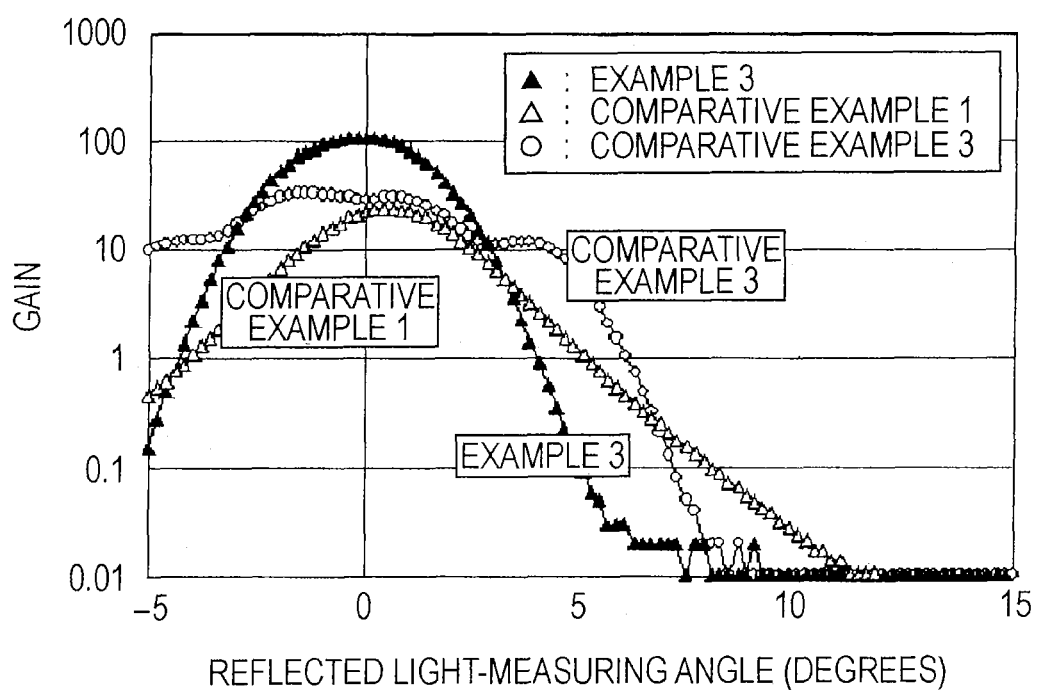
FIG. 12 is a graph showing diffuse reflection properties of Example 3, Comparative Example 1, and Comparative Example 3.

To suphpress the influence of rear surface reflection, each optical film was bonded to a black acrylic plate with a pressure-sensitive adhesive therebetween, and used as an evaluation sample. The evaluation sample was attached to a goniophotometer GP-1-3D (produced by Optec. Co., Ltd.), and irradiated with collimated light incident from a direction of −5° with respect to the sample surface. The specular reflection direction was defined as 0° and scanning was performed from −5° to 30° to determine the reflected light intensity under a dark-room condition, thus evaluating a diffuse reflection property. The results of Example 3, Comparative Example 1, and Comparative Example 3 are shown in FIG. 12 as typical examples. A gain of the vertical axis representing the reflected light intensity was calculated as follows: The same evaluation was performed using a standard diffusing plate composed of barium sulfate, and the reflected light intensity thereof in the specular reflection direction was defined as 1. The gain was determined by normalizing the reflected light intensities of the optical films of Example 1, Comparative Example 1, and Comparative Example 3 in the direction of 20° with respect to the specular reflection direction.

<Evaluation of Opacity>

Figure 13:
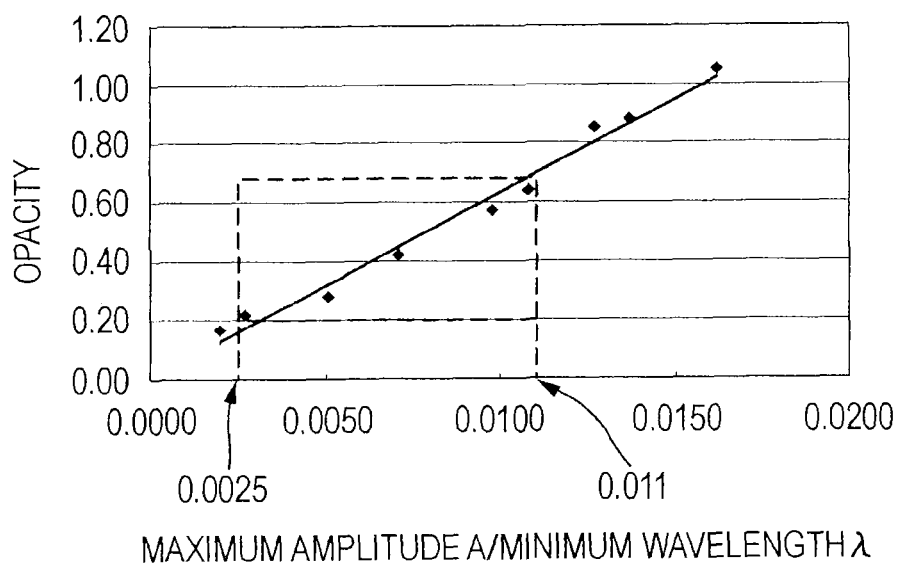
FIG. 13 is a graph showing the relationship between a ratio maximum amplitude A/minimum wavelength λ and opacity.

To suppress the influence of rear surface reflection, each optical film was bonded to a black acrylic plate with a pressure-sensitive adhesive therebetween, and used as an evaluation sample. Next, measurement was performed with an integrating sphere spectrocolorimeter SP64 produced by X-Rite Inc. in a d/8° optical system in which diffused light is applied to a surface of a sample and the reflected light is measured with a detector located at a position slanted at an angle of 8° with respect to the normal line direction of the sample. The SPEX mode in which specular reflection components are removed and only the diffuse reflection components are detected was used for the measured values, and the measurement was carried out at a detection viewing angle of 2°. Note that it was confirmed by experiments that the opacity measured here is correlated with the feeling of opacity that is visually observed. The results are shown in Table 1. In addition, the relationship between the ratio maximum amplitude A/minimum wavelength λ and the opacity is shown in FIG. 13.

<Evaluation of Antiglare Property>

Bare fluorescent lamps were reflected on each optical film, and the degree of blurring of the reflected image was evaluated on the basis of the following standard. The results are shown in Table 1.

⊙: The contours of the fluorescent lamps were not recognized. (Two fluorescent lamps were viewed as one fluorescent lamp.)

○: The fluorescent lamps could be recognized to some degree but their contours were blurred.

×: The fluorescent lamps were reflected as they were.

<Evaluation of Total Light Transmittance, Haze, and Internal Haze>

The total light transmittance and the haze were measured in accordance with JIS K-7361 and JISK K-7136 with HM-150 produced by Murakami Color Research Laboratory Co., Ltd. A TAC film was bonded to a surface of each optical film with a transparent pressure-sensitive adhesive therebetween, and a haze was then measured. The internal haze was determined by subtracting a haze of the bonded TAC from the haze measured above (so as to cancel the portion of the surface haze). The results are shown in Table 1.

<Evaluation of Pencil Hardness>

Each optical film was bonded onto a glass plate and was evaluated in accordance with a pencil hardness test method specified in JIS K-5400. The results are shown in Table 1.

<Evaluation of Electrical Resistance>

A surface electrical resistance was measured by pressing an MCP probe on the surface of an antiglare film with a resistivity meter (produced by Mitsubishi Chemical Corporation, trade name: Hiresta UP). Note that the electrical resistance was measured in an environment of 23° C. and 60% RH and with an applied voltage of 1,000 V. The results are shown in Table 2.

Tables 1 and 2 show the results of each of the evaluations described above.

In Examples 1 to 5, since no fine particles are contained in the hard-coating layer, naturally, the haze is small and the total light transmittance is large. Thus, the optical films of Examples 1 to 5 exhibit a high contrast owing to a combination of a high transparency and a low opacity.

An AG film located on the outermost surface of a display also requires a property as a hard coating in order to protect the display surface. As shown in the evaluation results of the pencil hardness of Table 1, a hard-coating layer is necessary because the TAC film is soft (Comparative Example 2). When a hard-coating agent is applied onto a surface of a TAC film on which a shape has been transferred, the difference in the height between the concavity and the convexity is decreased. Therefore, in order to achieve a desired antiglare property and opacity, it is necessary that the difference in the height between the concavity and the convexity of the transferred TAC film be controlled to be larger than the difference in the height between the concavity and the convexity of the outermost surface in advance.

Optical films provided with an antistatic function can be manufactured by the procedures described in Examples 6 and 7.

TABLE 1

| | Ratio A/λ | Antiglare property | Opacity (%) | Total light transmittance (%) | Haze (%) | Internal haze (%) | Pencil hardness |
|---|---|---|---|---|---|---|---|
| Example 1 | 0.0108 | ⊙ | 0.64 | 92.3 | 1 | 0.2 | 2H |
| Example 2 | 0.0098 | ⊙ | 0.57 | 92.3 | 1.1 | 0.3 | 2H |
| Example 3 | 0.0071 | ⊙ | 0.42 | 92.3 | 0.9 | 0.2 | 2H |
| Example 4 | 0.0051 | ○ | 0.28 | 92.2 | 1.1 | 0.3 | 2H |
| Example 5 | 0.0027 | ○ | 0.22 | 92.2 | 1 | 0.2 | 2H |
| Comparative Example 1 | — | ○ | 0.65 | 91.3 | 11.2 | 5.9 | 2H |
| Comparative Example 2 | 0.125 | ⊙ | 3.85 | 90.8 | 15.1 | 0.3 | B |
| Comparative Example 3 | 0.0162 | ⊙ | 1.05 | 92.2 | 1.3 | 0.2 | 2H |
| Comparative Example 4 | 0.0137 | ⊙ | 0.88 | 92.2 | 1.3 | 0.2 | 2H |
| Comparative Example 5 | 0.0127 | ⊙ | 0.85 | 92.2 | 1.2 | 0.2 | 2H |
| Comparative Example 6 | 0.002 | X | 0.17 | 92.5 | 1 | 0.3 | 2H |

TABLE 2

| | Surface electrical resistance (Ω/sq) |
|---|---|
| Example 1 | $10^{14}$ or more |
| Example 6 | $1.30 \times 10^{10}$ |
| Example 7 | $3.80 \times 10^{9}$ |

The following can be understood from the above evaluation results.

Comparing the opacity (Table 1) and the diffuse reflection property (FIG. 12) of Example 3, Comparative Example 1, and Comparative Example 3, the feeling of opacity can be decreased by decreasing the intensity of light components that diffuse from the specular reflection direction to wide angles.

As for the diffuse reflection property of Example 3 and Comparative Example 3, it is found that the light intensity drastically decreases at a certain angle, as compared with that of Comparative Example 1 in which a concavo-convex shape is formed on the surface by fine particles. This shows that the optical film of Example 3 can suppress the feeling of opacity while maintaining the degree of antiglare performance, as compared with the optical film described in Comparative Example 1.

The ratio maximum amplitude A/minimum wavelength λ can be easily controlled while maintaining a wave profile by changing the coating thickness of the resin layer.

Referring to Examples 1 to 5 and Comparative Examples 2 to 6, the opacity can be made to be 0.7 or less while maintaining the antiglare property by controlling this ratio maximum amplitude A/minimum wavelength λ to be 0.0025 to 0.011.

Test Examples

Figure 14:
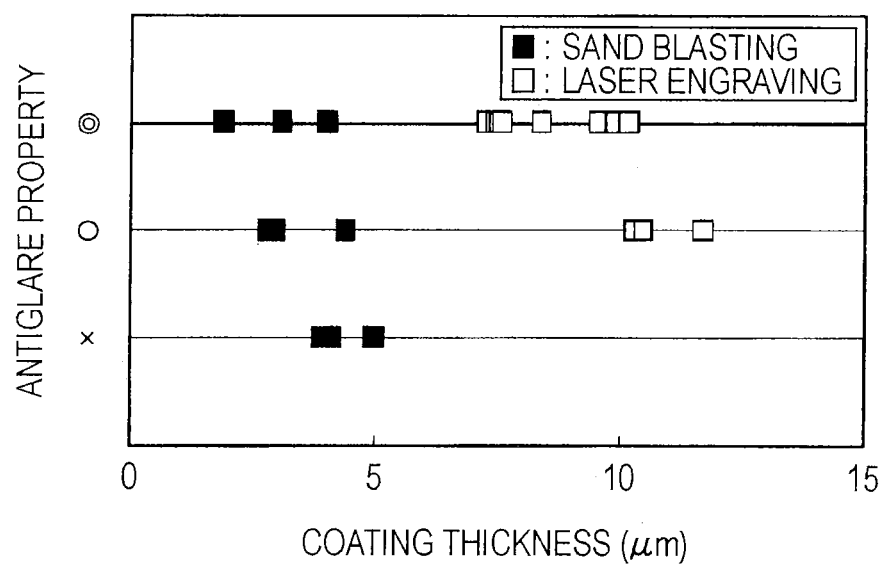
FIG. 14 is a graph showing the relationship between the coating thickness and the antiglare property.

The embossing roll was changed to a sand-blasted roll (prepared through a mesh of 200 lines/inch) and transfer was performed. The hard-coating agent was then applied in the same manner. FIG. 14 shows the relationship between the antiglare property and the coating thickness of optical films prepared using the sand-blasted roll and the laser-engraved roll, and both cases are compared.

<Evaluation of Coating Thickness>

The resin was applied onto a flat TAC film on which transfer was not performed, and the coating thickness was measured with a contact thickness meter (produced by TESA K. K.).

Referring to FIG. 14, the antiglare property of the optical films on which transfer was performed with the sand-blasted roll drastically disappeared in a coating thickness of about 4 to 6 μm. In contrast, the antiglare property of the optical films on which transfer was performed with the laser-engraved roll having a uniform concavo-convex height was stably maintained in the coating thickness range of 7 to 12 μm. Thus, an optical film on which transfer is performed with a laser-engraved roll easily maintains the antiglare property at a high level and is more desirable from the standpoint of productivity.

As described above, according to an optical film and a method for manufacturing the optical film of the present invention, an ideal optical film that exhibits a high antiglare property, a high contrast, and a high surface hardness can be realized.

The numerical values, shapes, structures, and the like described in the embodiments and Examples described above are merely examples, and other numerical values, shapes, structures, and the like, all of which are different from the above, may be used according to need.

Furthermore, individual structures of the first to third embodiments described above can be combined with each other as long as the gist of the present invention is not deviated.

Furthermore, in the embodiments described above, examples applied to optical films provided on display surfaces of liquid crystal displays and methods for manufacturing such optical films have been described. However, the embodiments are applicable to optical films used on display surfaces of various display apparatuses such as cathode ray tube (CRT) displays, plasma display panels (PDPs), electro luminescence (EL) displays, and surface-conduction electron-emitter displays (SEDs), and to methods for manufacturing such optical films. In addition, the size of the display apparatuses to which the present invention is applied is not particularly limited, and the present invention is applicable to all display apparatuses ranging from a small size to a large size.

In addition, in the embodiments described above, after the step of embossing transfer and before the step of coating a hard-coating agent, a base member 11 onto which an emboss pattern has been transferred may be subjected to a uniaxial stretching process or a biaxial stretching process. By performing a stretching process in this manner, the structures 11a are stretched in one direction or two directions, and thus shape anisotropy can be imparted to the structures 11a. For example, the shape of the structures 11a can be changed from a truncated cone shape to a truncated elliptical cone shape by a uniaxial stretching process.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

| Explanation of Reference Numerals | |
|---|---|
| 1: | optical film |
| 2: | liquid crystal panel |
| 2a, 2b: | polarizer |
| 3: | backlight |
| 11: | base member |
| 11a: | structure |
| 11b: | space between structures |
| 12: | hard-coating layer |
| 13: | hard-coating agent |
| 14: | antistatic layer |
| 15: | antireflection layer |
| 21: | embossing roll |
| 22: | back roll |

The invention claimed is:

1. An optical film comprising:
a base member having convex structures that are two-dimensionally and orderly arranged on a surface thereof; and
a hard-coating layer provided on the surface of the base member, the surface of the base member having the arranged structures thereon,
wherein a continuous wave surface is provided on a surface of the hard-coating layer so as to approximately conform to the shape of the structures of the surface of the base member,
a maximum amplitude A and a minimum wavelength $\lambda$ of the continuous wave surface are each substantially uniform, and
a ratio $(A/\lambda)$ of the maximum amplitude A to the minimum wavelength $\lambda$ is more than 0.002 and 0.011 or less.

2. The optical film according to claim 1, wherein a cross section of the hard-coating layer obtained by cutting along a line segment joining vertexes of adjacent structures has a continuous wave-like shape.

3. The optical film according to claim 2, wherein the cross section has a sinusoidal wave-like shape.

4. The optical film according to claim 1, wherein the structures are arranged in a hexagonal pattern.

5. The optical film according to claim 1,
wherein the structures are orderly arranged in two different directions when viewed from a vertex of any one of the structures, and
each of the cross sections of the hard-coating layer obtained by cutting in the two different directions has a continuous wave-like shape.

6. The optical film according to claim 1, wherein the structures each have a semispherical shape, a pyramidal shape, or a columnar shape.

7. The optical film according to claim 1, wherein the optical film has a total light transmittance of 92% or more, a haze of 1.5% or less, an internal haze of 0.5% or less, and an opacity of 0.7% or less.

8. The optical film according to claim 1,
wherein the structures of the surface of the base member are formed by embossing, and
the height of each of the structures is substantially uniform.

9. The optical film according to claim 1, wherein a refractive index of the base member is higher than a refractive index of the hard-coating layer.

10. The optical film according to claim 1, wherein the base member contains any one of triacetyl cellulose, polyethylene terephthalate, a cycloolefin, and a styrene/butadiene copolymer as a main component.

11. The optical film according to claim 1, wherein the hard-coating layer contains at least one of thermosetting resins and ultraviolet-curable resins.

12. The optical film according to claim 1, wherein the hard-coating layer contains an antistatic agent.

13. The optical film according to claim 1, further comprising an antistatic layer provided between the base member and the hard-coating layer.

14. The optical film according to claim 1, further comprising an antireflection layer provided on the hard-coating layer.

15. The optical film according to claim 1, wherein the amounts of concavity and convexity of the surface of the base member are larger than the amounts of concavity and convexity of the surface of the hard-coating layer.

16. The optical film according to claim 1, wherein the hard-coating layer does not contain fine particles.

17. The optical film according to claim 1, wherein a thickness of the hard-coating layer ranges from 3 μm to 20 μm.

18. The optical film according to claim 1, wherein a thickness of the hard-coating layer ranges from 7 μm to 12 μm.

19. A method for manufacturing an optical film, the method comprising:

forming convex structures two-dimensionally and orderly on a surface of a base member; and forming a hard-coating layer by applying a hard-coating agent onto the surface of the base member, the surface of the base member having the structures thereon, and curing the hard-coating agent, wherein a continuous wave surface is formed on a surface of the hard-coating layer so as to approximately conform to the shape of the structures of the surface of the base member, a maximum amplitude A and a minimum wavelength $\lambda$ of the continuous wave surface are each substantially uniform, and a ratio (A/$\lambda$) of the maximum amplitude A to the minimum wavelength $\lambda$ is more than 0.002 and 0.011 or less.

20. The method for manufacturing an optical film according to claim 19, wherein, in forming the hard-coating layer, the ratio (A$\lambda$) is controlled by changing the thickness of the hard-coating agent applied onto the surface of the base member, the surface having the structures thereon.

21. The method for manufacturing an optical film according to claim 19, wherein, in forming the structures on a surface of a base member, the structures are formed on the surface of the base member by transferring a concavo-convex shape onto the surface of the base member with an embossing roll.

22. An antiglare polarizer comprising:

a polarizer; and an optical film provided on the polarizer, wherein the optical film includes a base member having convex structures that are two-dimensionally and orderly arranged on a surface thereof, and a hard-coating layer provided on the surface of the base member, the surface of the base member having the arranged structures thereon, a continuous wave surface is provided on a surface of the hard-coating layer so as to approximately conform to the shape of the structures of the surface of the base member, a maximum amplitude A and a minimum wavelength $\lambda$ of the continuous wave surface are each substantially uniform, and a ratio (A/$\lambda$) of the maximum amplitude A to the minimum wavelength $\lambda$ is more than 0.002 and 0.011 or less.

23. A display apparatus comprising:

a display unit that displays an image; and an optical film provided on a display surface side of the display unit, wherein the optical film includes a base member having convex structures that are two-dimensionally and orderly arranged on a surface thereof, and a hard-coating layer provided on the surface of the base member, the surface having the arranged structures thereon, a continuous wave surface is provided on a surface of the hard-coating layer so as to approximately conform to the shape of the structures of the surface of the base member, a maximum amplitude A and a minimum wavelength $\lambda$ of the continuous wave surface are each substantially uniform, and a ratio (A$\lambda$) of the maximum amplitude A to the minimum wavelength $\lambda$ is more than 0.002 and 0.011 or less.

* * * * *